UNITED STATES PATENT OFFICE.

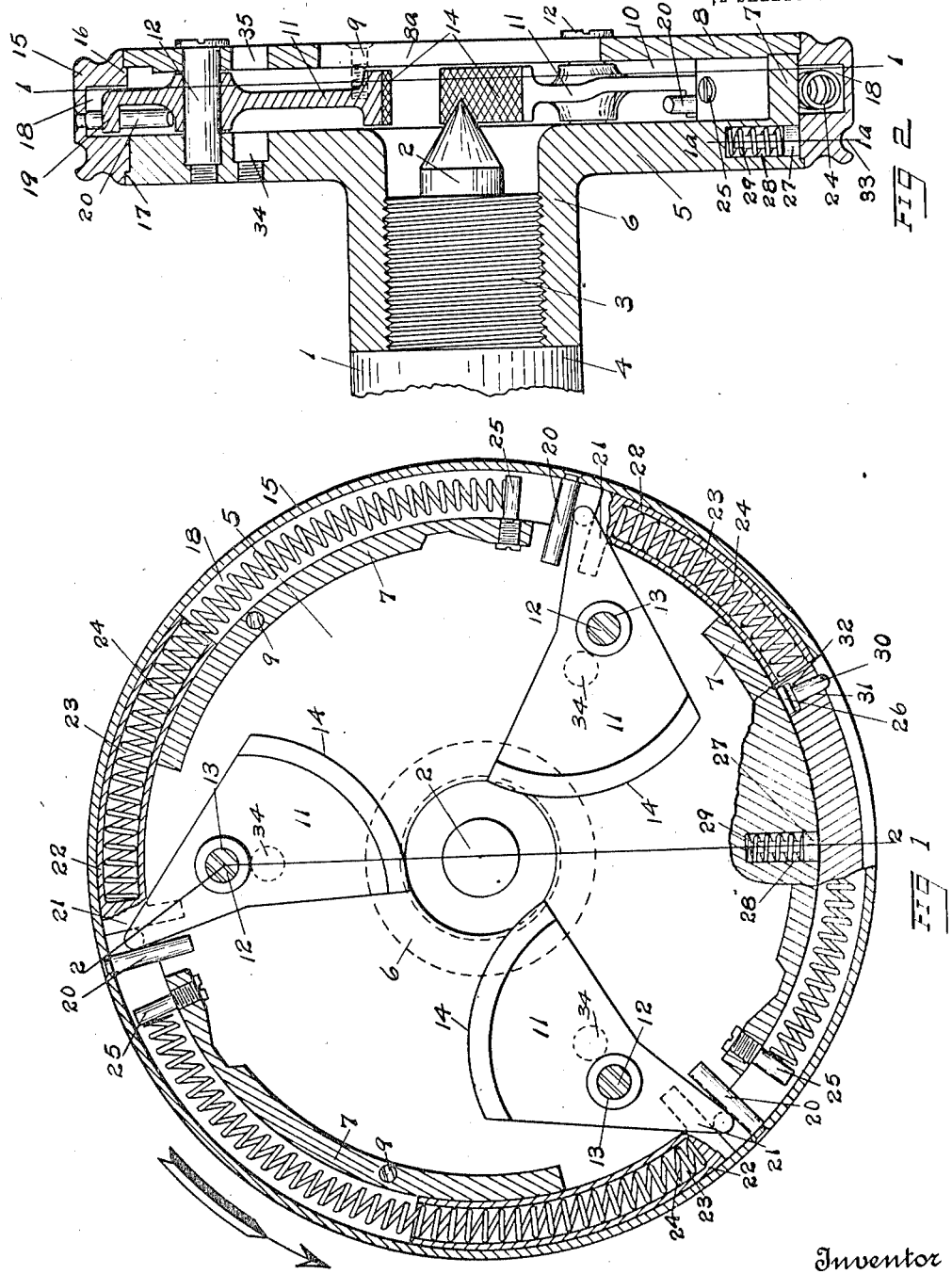

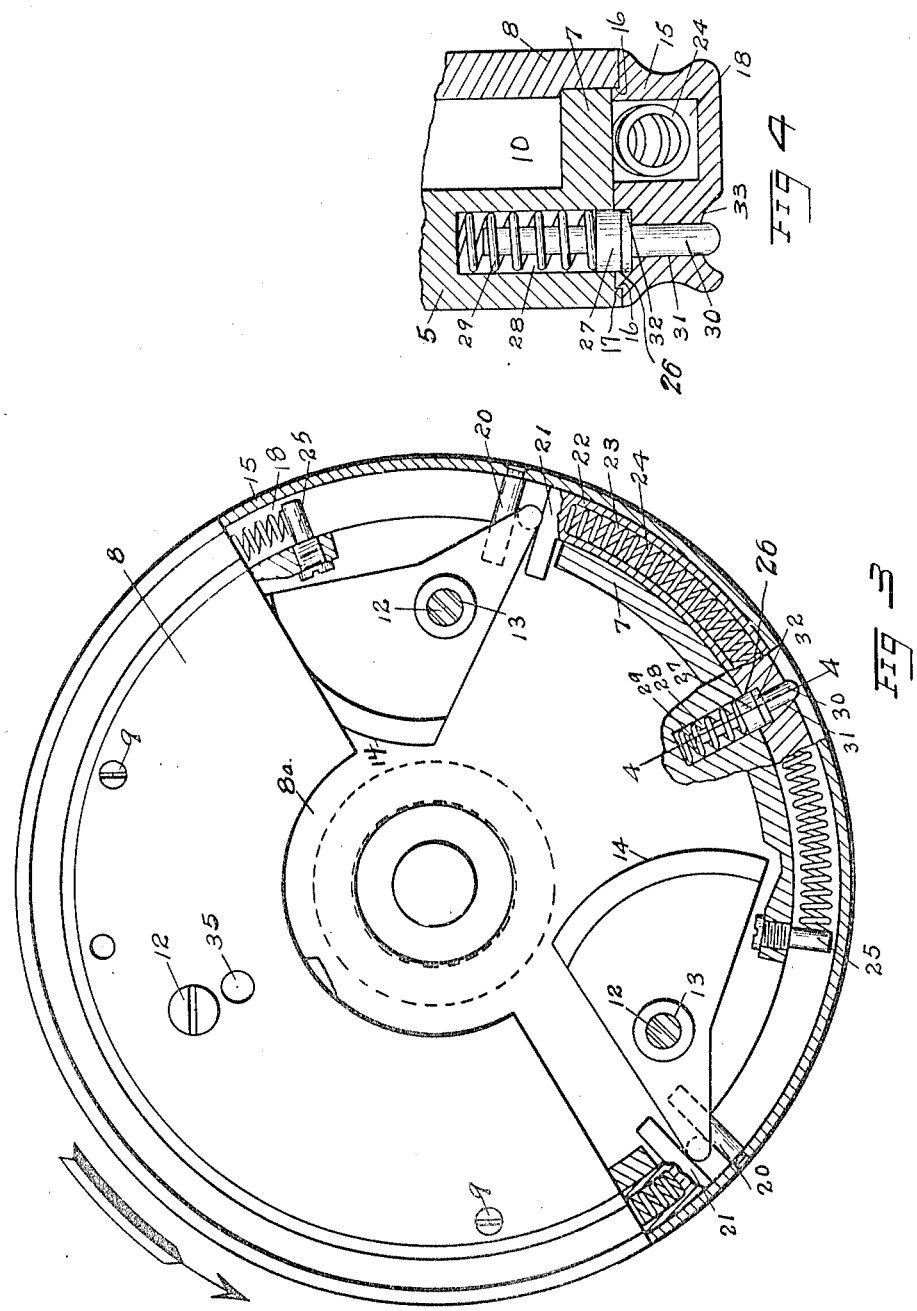

FRANK P. MILLER, OF MEADVILLE, PENNSYLVANIA.

CHUCK.

1,072,142.  Specification of Letters Patent.  Patented Sept. 2, 1913.

Application filed May 21, 1912. Serial No. 698,869.

*To all whom it may concern:*

Be it known that I, FRANK P. MILLER, a citizen of the United States, residing at Meadville, in the county of Crawford and State of Pennsylvania, have invented new and useful Improvements in Chucks, of which the following is a specification.

This invention relates to chucks and consists in certain improvements in the construction thereof as will be hereinafter fully described and pointed out in the claims.

One of the leading objects of the invention is to provide a chuck or face plate for a lathe with means for securing the work and releasing the same while the chuck or face plate is in motion. In this way, the turning or grinding operations may be more expeditiously performed because the work may be shifted without shutting down the lathe.
This is particularly important where the pieces being machined or ground are such as to require but a small amount of work on each piece in which case the shifting operation ordinarily takes up quite a large percentage of the time required for the operation.

The invention is illustrated in the accompanying drawings as follows:—

Figure 1 shows a section on the line 1—1 in Fig. 2, a part being broken away to a section on the line 1ª—1ª. Fig. 2 is a section on the line 2—2 in Fig. 1. Fig. 3 a front elevation partly in section on the line 1—1 in Fig. 2, a section being broken away to a section on the line 1ª—1ª in Fig. 2. Fig. 4 a section of a fragment on the line 4—4 in Fig. 3.

1 marks the lathe spindle, 2 a center arranged in the lathe spindle in the ordinary manner. The lathe spindle is screw threaded at 3, the screw thread terminating in the shoulder 4. The carrying plate 5 of the chuck has the screw threaded hub 6 which is screwed on to the screw threads 3 of the spindle and against the shoulder 4. The carrying plate 5 has a series of flange projections 7, these flange projections being equal in number to the number of dogs on the chuck. A front or covering plate 8 is secured against the flanges 7 and to the carrying plate 5 by screws 9 which extend through the plate 8 and into the flanges 7. An annular cavity or recess 10 is formed between the covering plate 8 and the carrying plate 5 and the dogs 11 are mounted in this cavity. These dogs as shown are swinging dogs and are carried by the screws 12 which extend through the plate 8, perforations 13 in the dog and into the carrying plate. The dogs have the work faces 14 which are preferably serrated and are so mounted as to extend within the opening 8ª in the cover plate. The faces 14 are eccentric to the perforations 13 so that in operation they form cam faces with relation to their pivotal mountings.

An operating ring 15 is rotatively mounted on the carrying plate 5, cover 8 and flange projection 7. The operating ring 15 is provided with shoulders 16 one of which is engaged by the cover plate 8 and the other by a shoulder 17 on the carrying plate. The operating ring is, therefore, free to rotate relatively to the carrying plate but is locked by the shoulders 16 against axial movement relatively thereto. The operating ring 15 has the annular recess 18. The outer ends of the dogs extend into this recess and are provided with the lateral fingers 19. These lateral fingers are engaged on the one side by pins 20 which are secured to the operating ring 15 and extend inwardly therefrom through the recess 18. The other side of the fingers 19 are engaged by the ends 21 of plungers 22. These plungers 22 are slidingly mounted in the recess 18. They are provided with a socket or cavity 23 into which extends a spring 24. The spring extends circumferentially into the recess 18 and has one end of the spring resting against the end of cavity 23 in the plunger 22 and the opposite end of the spring against the screw 25 which is screwed through the projecting flange 7 into the recess 18. It will be seen from this construction that if the operating ring 15 is released, the pins 20 being free to move with the operating ring, the dogs 11 will be swung by the action of the springs 24 on the plunger 22 so as to force the dogs into contact with the work. The dogs being in the form of cams their gripping action is increased by the resistance of the work so that the slipping of the work in the dogs is prevented. It will be noticed also that the pins 20 offer no resistance to the movement and there being an individual plunger 22 for each dog, each dog will be forced to the work regardless of whether the work presents surfaces of uniform distance from the center or not.

In order to disengage the dogs from the work it is only necessary to retard the operating ring 15 permitting the carrying plate to continue its rotation. This retarding movement exerts pressure on the dogs through the pins 20 so as to swing the faces of the dogs forward, thus releasing them from the work. The face of the operating ring is so formed as to permit of its being readily grasped by the hand of the operator so that it may be retarded in this way.

In order to lock the operating ring in position to maintain the dogs in an open position while a new piece of work is being put in place, the following mechanism is provided: A socket 26 is arranged on the inner periphery of the operating ring 15, and a catch 27 is mounted in the socket 28 in the carrying plate 5. A spring 29 operates against the catch 27 so that when it is brought into register with the socket 26, it is forced outwardly into the socket 26 and thus locks the operating ring with the carrying plate and prevents the return movement of the operating ring under the influence of the springs 24. A release pin 30 extends through an opening 31 into the socket 26, the release pin being of slightly smaller diameter than the socket 26 and being provided with a shoulder 32 to prevent its dropping out of the socket 26. The release pin 30 extends into an annular groove 33 on the outer face of the operating ring. The pin, therefore, is not in such position as to interfere with the grasping of the operating ring to release the dogs. On the other hand, this release pin can be readily forced inwardly by the operator pressing a finger in the groove 33 so that the pin 30 will contact it and the pin being thus forced inwardly forces the catch 27 out of the socket 26, thus releasing the ring so that the dogs may be swung into engagement with the work under the influence of the springs 24 as above described.

In order that the same set of dogs may be used for different sizes of work, I have provided an extra opening 34 in the carrying plate and an opening 35 in the cover plate through which the screws 12 may be placed so as to move the dogs to a position near the center of the chuck. It will be noted that the pin 20 and the end 21 of the plunger extends inwardly a sufficient distance to engage the finger 19 even though the dogs are in this inner position.

What I claim as new is:—

1. In a chuck, the combination of a carrying plate; a movable dog carried by the plate; devices rotative relatively to said carrying plate for actuating said dog in one direction; a spring for throwing the dog in the opposite direction, said devices operating to actuate the dog against the spring when retarded relatively to the plate; and a catch for locking said devices when retarded, said catch being adapted to be operated with the parts in motion.

2. In a chuck, the combination of a carrying plate; a movable dog carried by said plate; a friction ring adapted to be grasped by the hand of an operator rotatively mounted on said plate; means on the ring for actuating the dog in one direction when retarded; a spring for operating the dog in the opposite direction; and a catch for locking said ring against the spring, said catch adapted to be operated with the ring in motion.

3. In a chuck, the combination of a carrying plate; a centering device at the axis of the carrying plate; movable dogs carried by said plate; means for throwing said dogs into engagement with a piece of work, said means permitting the individual action of the dogs to vary; and devices adapted to be operated with the parts in motion for releasing said dogs.

4. In a chuck, the combination of a carrying plate; a centering device at the axis of the carrying plate; a plurality of swinging dogs mounted on said plate, said dogs having cam faces; individual means for throwing said dogs into engagement with the work, said means permitting variations in the movement of said dogs; and devices adapted to be operated with the parts in motion for throwing said dogs out of engagement.

5. In a chuck, the combination of a carrying plate; a plurality of dogs mounted on said carrying plate, said dogs having cam faces; an operating ring rotatively mounted on the carrying plate; means carried by the ring engaging the dogs for moving the dogs in one direction when retarded; springs operating against the dogs and the carrying plate and moving the dogs in the opposite direction; and a catch for locking the operating ring when moved against the action of the spring, said catch being adapted to be released with the parts in motion.

6. In a chuck, the combination of a carrying plate; swinging dogs having cam faces mounted on said plate; an operating ring rotatively mounted on said plate, said operating ring having an annular groove therein; pins extending inwardly from the operating ring for engaging the dogs; plungers mounted in the annular groove and operating against said dogs; springs arranged in said annular groove and operating against said plungers and said carrying plate; and a catch for locking the operating ring when moved against said springs.

7. In a chuck, the combination of a carrying plate; a swinging dog mounted on the plate, the face of said dog being adapted to swing toward and from the axis of the plate; means for adjusting the dog toward and from the center; and devices adapted to be operated with the plate in motion for actuating said dog.

In testimony whereof I have hereunto set my hand in the presence of two subscribing witnesses.

FRANK P. MILLER.

Witnesses:
F. G. MILLER,
M. M. GRAND.